5293X
2 Sheets—Sheet 1.
E. CLARK.
Manufacture of White Lead.
Patented Dec. 4. 1828.
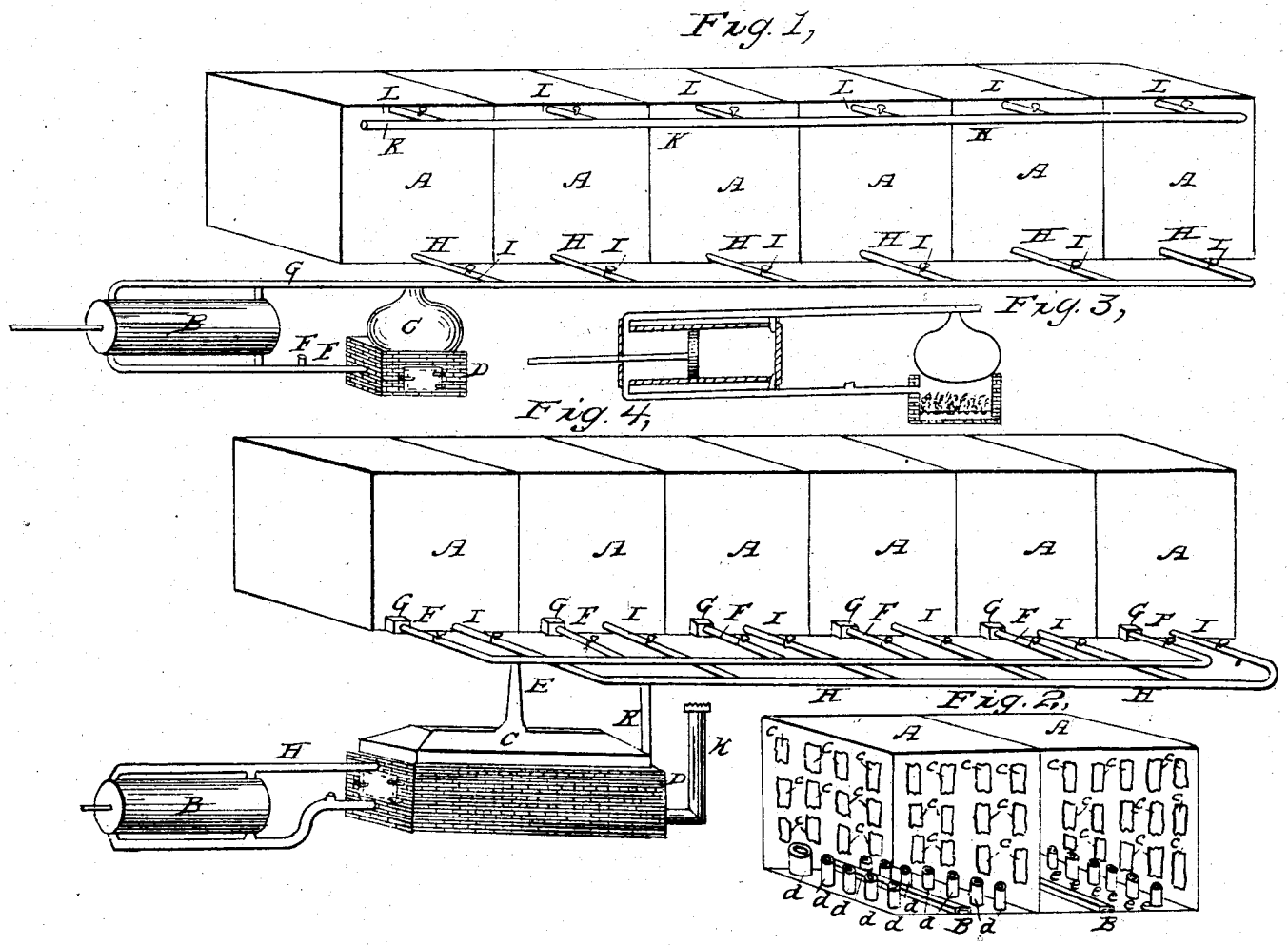

5293X
2 Sheets—Sheet 2.
E. CLARK.
Manufacture of White Lead.
Patented Dec. 4, 1828.
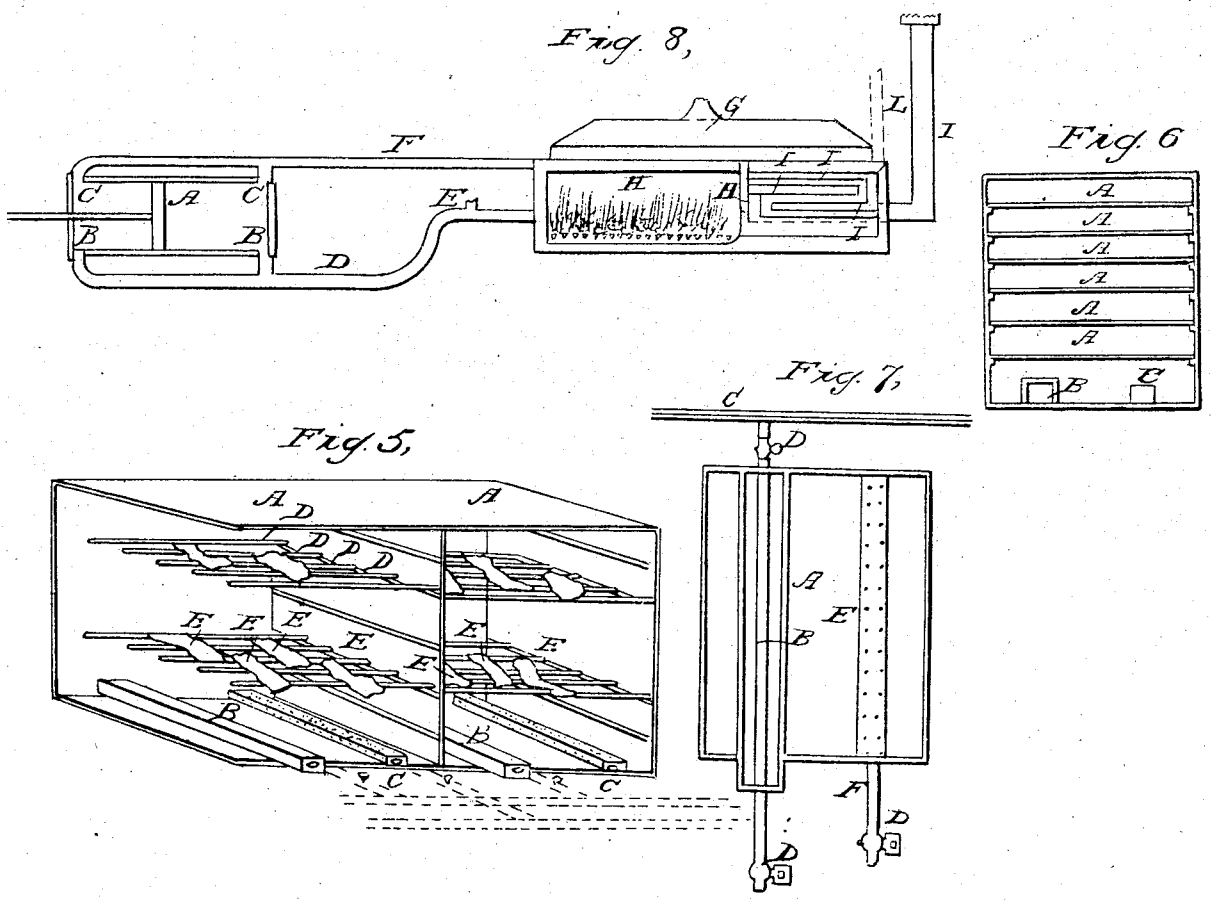

United States Patent Office

PTO - BOYERS, PA Duty Station

MISSING PAGE TEMPORARY NOTICE

PATENT # 5293 X FOR ISSUE DATE 12-4-1828

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text

Data Conversion Operation

Boyers, Pa